US008758186B2

(12) United States Patent
Mellet et al.

(10) Patent No.: US 8,758,186 B2
(45) Date of Patent: *Jun. 24, 2014

(54) MULTI-SPEED TRANSMISSION

(71) Applicant: GM Global Technology Operations LLC, Detroit, MI (US)

(72) Inventors: Edward W. Mellet, Rochester Hills, MI (US); James B. Borgerson, Clarkston, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,999

(22) Filed: May 7, 2013

(65) Prior Publication Data

US 2013/0252779 A1    Sep. 26, 2013

Related U.S. Application Data

(63) Continuation of application No. 13/284,224, filed on Oct. 28, 2011, now Pat. No. 8,435,154.

(51) Int. Cl.
*F16H 1/32* (2006.01)
*F16H 3/62* (2006.01)
*F16H 3/66* (2006.01)
*F16H 3/44* (2006.01)

(52) U.S. Cl.
CPC .......... *F16H 3/62* (2013.01); *F16H 2200/2012* (2013.01); *F16H 3/66* (2013.01); *F16H 2003/445* (2013.01); *F16H 2200/0073* (2013.01); *F16H 2200/2048* (2013.01)

USPC ............................................ 475/278; 475/284

(58) Field of Classification Search
CPC .................... F16H 2200/00; F16H 2200/0073; F16H 2200/2012; F16H 2200/2048
USPC .................................. 475/275, 277, 278, 284
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,960,149 B2 | 11/2005 | Ziemer | |
| 6,984,187 B2 | 1/2006 | Biermann | |
| 6,991,578 B2 | 1/2006 | Ziemer | |
| 7,018,319 B2 | 3/2006 | Ziemer | |
| 7,101,305 B2 | 9/2006 | Tabata et al. | |
| 7,163,484 B2 * | 1/2007 | Klemen | 475/276 |
| 8,137,232 B2 * | 3/2012 | Wittkopp et al. | 475/280 |
| 2004/0048716 A1 * | 3/2004 | Ziemer | 475/286 |
| 2005/0090362 A1 | 4/2005 | Abe et al. | |
| 2007/0225108 A1 | 9/2007 | Kamm et al. | |
| 2007/0225109 A1 | 9/2007 | Jang | |
| 2008/0020890 A1 * | 1/2008 | Shim | 475/276 |
| 2009/0239699 A1 * | 9/2009 | Baldwin | 475/276 |
| 2011/0105267 A1 | 5/2011 | Wittkopp et al. | |
| 2012/0172173 A1 | 7/2012 | Wittkopp et al. | |

* cited by examiner

*Primary Examiner* — Justin Holmes

(57) ABSTRACT

A transmission of the present invention has an input member, an output member, four planetary gear sets, a plurality of coupling members and a plurality of torque transmitting devices. Each of the planetary gear sets includes first, second and third members. The torque transmitting devices may include clutches and brakes. The torque transmitting devices are each selectively engageable in combinations of at least three to establish a plurality of forward speed ratios and at least one reverse speed ratio.

38 Claims, 3 Drawing Sheets

| GEAR STATE | GEAR RATIO | RATIO STEP | TORQUE TRANSMITTING ELEMENTS | | | | | | |
|---|---|---|---|---|---|---|---|---|---|
| | | | 36,32 | 26 | 32,36 | 34 | 28 | 38 | 30 |
| REV | -7.100 | | | X | | X | | X | |
| N | | -1.04 | | | | | | | |
| 1ST | 6.859 | | X | X | | | | X | |
| 2ND | 4.001 | 1.71 | X | | | | X | X | |
| 3RD | 2.853 | 1.40 | | X | | | X | X | |
| 4TH | 2.035 | 1.40 | | | | X | X | X | |
| 5TH | 1.639 | 1.24 | | | | | X | X | X |
| 6TH | 1.269 | 1.29 | | | | X | X | | X |
| 7TH | 1.000 | 1.27 | | X | | | X | | X |
| 8TH | 0.869 | 1.15 | X | | | | X | | X |
| 9TH | 0.765 | 1.14 | X | X | | | | | X |
| 10TH | 0.655 | 1.17 | X | | | X | | | X |
| 11TH | 0.575 | 1.14 | | X | | X | | | X |

X = ON - ENGAGED CARRYING TORQUE

MULTI-SPEED TRANSMISSION

CROSS-REFERENCE TO RELATED APPLICATIONS

This application is a continuation of U.S. application Ser. No. 13/284,224, filed on Oct. 28, 2011 which is hereby incorporated in its entirety herein by reference.

FIELD

The invention relates generally to a multiple speed transmission having a plurality of planetary gear sets and a plurality of torque transmitting devices, and more particularly to a transmission having a plurality of speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In an aspect of the present invention, an output member continuously interconnected with the ring gear of the third planetary gear set and with the carrier member of the fourth planetary gear set.

In an aspect of the present invention, an output member continuously interconnected with the ring gear of the third planetary gear set and with the ring gear of the fourth planetary gear set.

In an aspect of the present invention, an output member continuously interconnected with the carrier member of the third planetary gear set and with the carrier member of the fourth planetary gear set.

In another aspect of the present invention, a transmission is provided having a first interconnecting member for continuously interconnecting the third member of the first planetary gear set with the third member of the second planetary gear set and the first member of the third planetary gear set.

In yet another aspect of the present invention, a transmission is provided having a second interconnecting member for continuously interconnecting the second member of the first planetary gear set with the second member of the second planetary gear set.

In yet another aspect of the present invention, a transmission is provided having a third interconnecting member for continuously interconnecting the second member of the third planetary gear set with the third member of the fourth planetary gear set.

In yet another aspect of the present invention, a transmission is provided having a first torque transmitting device for selectively engaging the first member of the first planetary gear set with the input member.

In yet another aspect of the present invention, a transmission is provided having a second torque transmitting device for selectively engaging the second member of the first planetary gear set and the second member of the second planetary gear set with the input member.

In yet another aspect of the present invention, a transmission is provided having a third torque transmitting device for selectively engaging the second member of the third planetary gear set and the third member of the fourth planetary gear set with the input member.

In yet another aspect of the present invention, a transmission is provided having a fourth torque transmitting device for selectively engaging the first member of the first planetary gear set with the stationary member.

In yet another aspect of the present invention, a transmission is provided having a fifth torque transmitting device for selectively engaging the second member of the second planetary gear set with the stationary member.

In yet another aspect of the present invention, a transmission is provided having a sixth torque transmitting device for selectively engaging the first member of the second planetary gear set with the stationary member.

In yet another aspect of the present invention, a transmission is provided having a seventh torque transmitting device for selectively engaging the first member of the fourth planetary gear set with the stationary member.

In still another aspect of the present invention, the torque transmitting devices are each selectively engageable in combinations of at least three to establish a plurality of forward speed ratios and at least one reverse speed ratio between the input member and the output member.

In still another aspect of the present invention, the carrier member of the second planetary gear set rotatable supports a first and second set of planet pinions and the first set of planet pinions mesh with the sun gear and the second set of planet pinions and the second set of planet pinions mesh with the ring gear and the first set of planet pinions.

In yet another aspect of the present invention, the carrier member of the fourth planetary gear set rotatable supports a first and second set of planet pinions and the first set of planet pinions mesh with the sun gear and the second set of planet pinions and the second set of planet pinions mesh with the ring gear and the first set of planet pinions.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
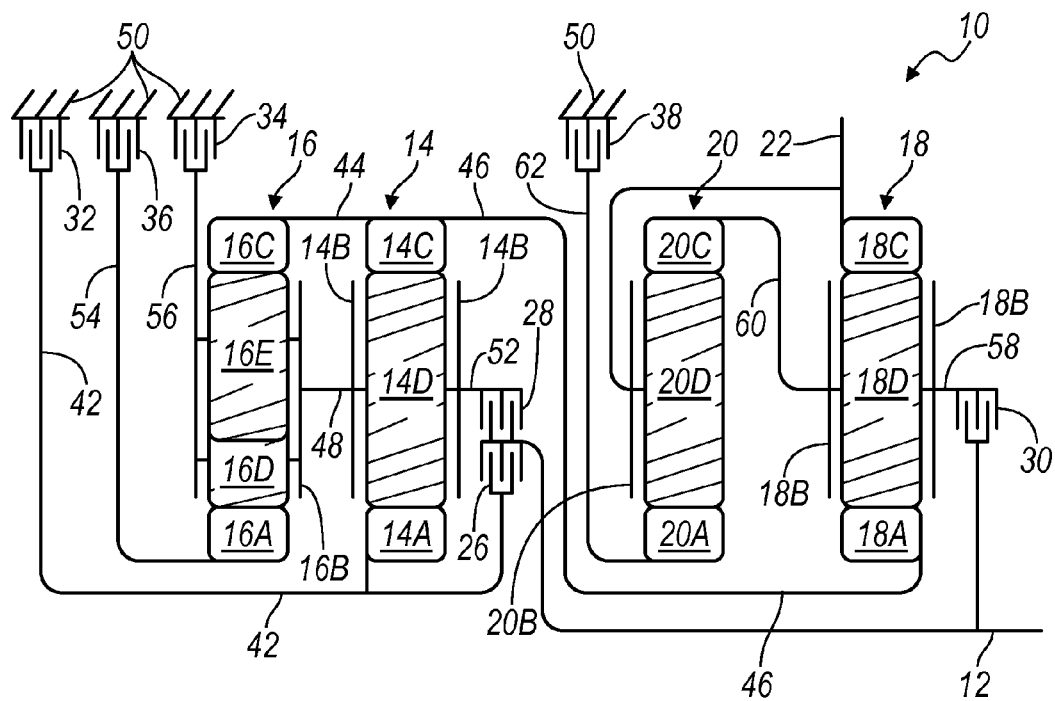
FIG. 1 is a diagrammatic representation of an embodiment of an eleven speed transmission according to the present invention.

Referring now to FIG. 1, a stick diagram presents a schematic layout of an embodiment of an eleven speed transmission 10 according to the present invention. Transmission 10 includes four planetary gear sets 14, 16, 18 and 20. First planetary gear set 14 includes a sun gear member 14A, a ring gear member 14C and a planet gear carrier member 14B that rotatably supports a set of planet gears 14D (only one of which is shown). The set of planet gears 14D are each configured to intermesh with both the sun gear member 14A and a ring gear member 14C. The sun gear member 14A is connected for common rotation with a first shaft or interconnecting member 42. The ring gear member 14C is connected for common rotation with a second shaft or interconnecting member 44 and with a third shaft or interconnecting member 46. The planet carrier member 14B is connected for common rotation with a fourth shaft or interconnecting member 48 and with a fifth shaft or interconnecting member 52.

The planetary gear set 16 includes a sun gear member 16A, a ring gear member 16C and a planet gear carrier member 16B that rotatably supports a first set of planet gears 16D (only one of which is shown) and a second set of planet gears 16E (only one of which is shown). The first set of planet gears 16D are each configured to intermesh with both the sun gear member 16A and the second set of planet gears 16E. The second set of planet gears 16E are each configured to intermesh with both the ring gear member 16C and the first set of planet gears 16D. The sun gear member 16A is connected for common rotation with a sixth shaft or interconnecting member 54. The ring gear member 16C is connected for common rotation with the second shaft or interconnecting member 44. The planet carrier member 16B is connected for common rotation with the fourth shaft or interconnecting member 48 and a seventh shaft or interconnecting member 56.

Planetary gear set 18 includes a sun gear member 18A, a ring gear member 18C and a planet gear carrier member 18B that rotatably supports a set of planet gears 18D (only one of which is shown). The set of planet gears 18D are each configured to intermesh with both the sun gear member 18A and the ring gear member 18C. The sun gear member 18A is connected for common rotation with the third shaft or interconnecting member 46. The ring gear member 18C is connected for common rotation with the output shaft or member 22. The planet carrier member 18B is connected for common rotation with an eighth shaft or interconnecting member 58 and with a ninth shaft or interconnecting member 60.

The planetary gear set 20 includes a sun gear member 20A, a ring gear member 20C and a planet gear carrier member 20B that rotatably supports a set of planet gears 20D (only one of which is shown). The set of planet gears 20D are each configured to intermesh with both the sun gear member 20A and the ring gear member 20C. The sun gear member 20A is connected for common rotation with a tenth shaft or interconnecting member 62. The ring gear member 20C is connected for common rotation with the ninth shaft or interconnecting member 60. The planet carrier member 20B is connected for common rotation with output shaft or member 22.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or the clutches 26, 28, 30 and the brakes 32, 34, 36 and 38 allow for selective interconnection of the shafts or interconnecting members, members of the planetary gear sets and the housing. For example, the first clutch 26 is selectively engageable to connect the first shaft or interconnecting member 42 with the input shaft or member 12. The second clutch 28 is selectively engageable to connect the fifth shaft or interconnecting member 52 with the input shaft or member 12. The third clutch 30 is selectively engageable to connect the eighth shaft or interconnecting member 58 with the input shaft or member 12. The first brake 32 is selectively engageable to connect the first shaft or interconnecting member 42 with the stationary element or the transmission housing 50 in order to prevent the member 42 from rotating relative to the transmission housing 50. The second brake 34 is selectively engageable to connect the seventh shaft or interconnecting member 56 with a stationary element or the transmission housing 50 in order to prevent member 56 from rotating relative to the transmission housing 50. The third brake 36 is selectively engageable to connect the sixth shaft or interconnecting member 54 with the stationary element or the transmission housing 50 in order to prevent the member 54 from rotating relative to the transmission housing 50. The fourth brake 38 is selectively engageable to connect the tenth shaft or interconnecting member 62 with the stationary element or the transmission housing 50 in order to prevent the member 62 from rotating relative to the transmission housing 50.

Figure 2:
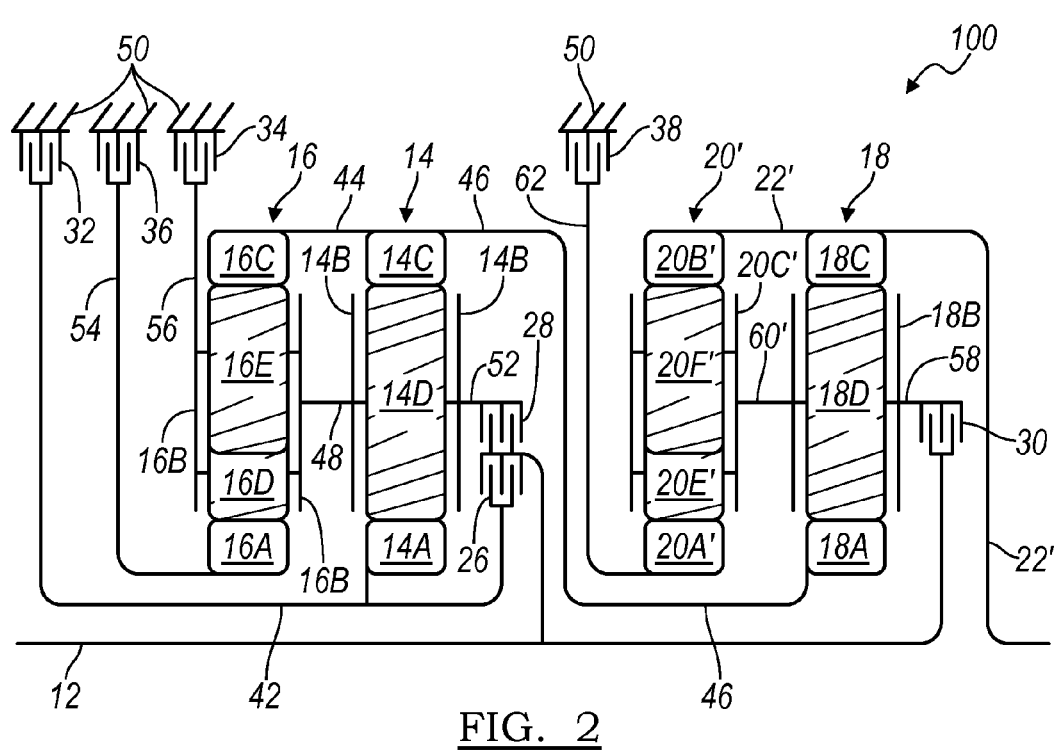
FIG. 2 is a diagrammatic representation of another embodiment of an eleven speed transmission according to the present invention.

With reference to FIG. 2, an alternate embodiment of an eleven speed transmission 100 of the present invention is illustrated schematically. Transmission 100 has the some of the same components as transmission 10 including planetary gear sets, clutches and brakes, interconnecting members of the planetary gear sets as indicated by like reference numbers depicting like components. However, transmission 100 replaces the planetary gear set 20 which is a simple planetary gear set with a compound planetary gear set 20'. As described above, the simple planetary gear set 20 has a carrier member 20B that rotatable supports only one set of planet gears or pinion gears 20D. In contrast, planetary gear set 20' is referred to as a compound planetary gear set because planetary gear set 20' has a carrier member 20C' that supports two sets of planet or pinion gears 20E' and 20F'. Further, compound planetary gear set 20' has a sun gear 20A' and a ring gear 20B'. Moreover, interconnecting member 60 has been reconfigured as interconnecting member 60' and now connects the carrier member 20C' to carrier member 18B. Further, output shaft 22 has been reconfigured as output shaft or member 22'. Output shaft 22' now connects to ring gear 20B' and to ring gear 18C. Accordingly, the other interconnecting members of transmission 100 remain the same in number or quantity as transmission 10, however, the length and configuration or shape of the interconnecting members are modified as shown in FIG. 2 to make the required connections between the members of the planetary gear sets and the clutches and brakes.

Figure 3:
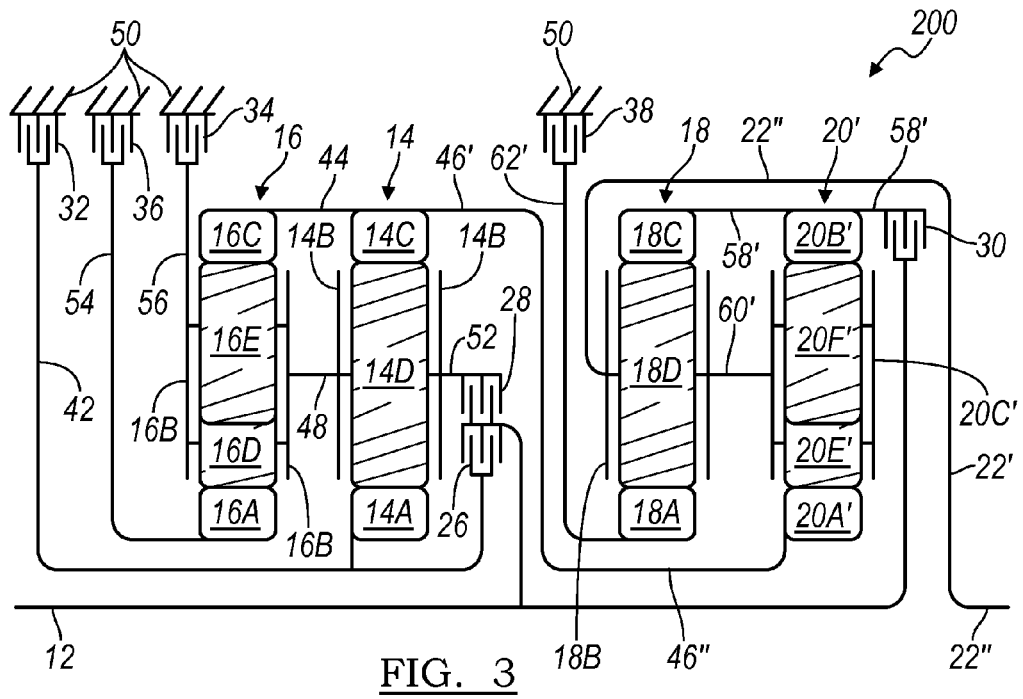
FIG. 3 is a diagrammatic representation of yet another embodiment of an eleven speed transmission according to the present invention.

With reference to FIG. 3, another embodiment of an eleven speed transmission 200 of the present invention is illustrated schematically. Transmission 200 has the some of the same components as transmission 100 including planetary gear sets, clutches and brakes, interconnecting members of the planetary gear sets as indicated by like reference numbers depicting like components. However, in transmission 200 planetary gear set 18 is disposed between planetary gear set 14 and planetary gear set 20' instead of planetary gear set 20' being disposed between planetary gear set 14 and planetary gear set 18 as is the case for transmission 100. Moreover, interconnecting member 46 has been reconfigured as interconnecting member 46' and now connects the sun gear member 20A' to ring gear member 14C. Interconnecting member 58 has been reconfigured as interconnecting member 58' and now connects the ring gear member 18C and ring gear member 20B' to input shaft 12 through clutch 30. Interconnecting member 62 has also been reconfigured as interconnecting member 62' and now connects the sun gear member 18A to the transmission housing 50. Further, output shaft 22' has been reconfigured as output shaft or member 22". Output shaft 22" now connects to carrier member 18B and to carrier member 20C'. Accordingly, the other interconnecting members of transmission 200 remain the same in number or quantity as transmission 100, however, the length and configuration or shape of the interconnecting members are modified as shown in FIG. 3 to make the required connections between the members of the planetary gear sets and the clutches and brakes.

Figure 4:
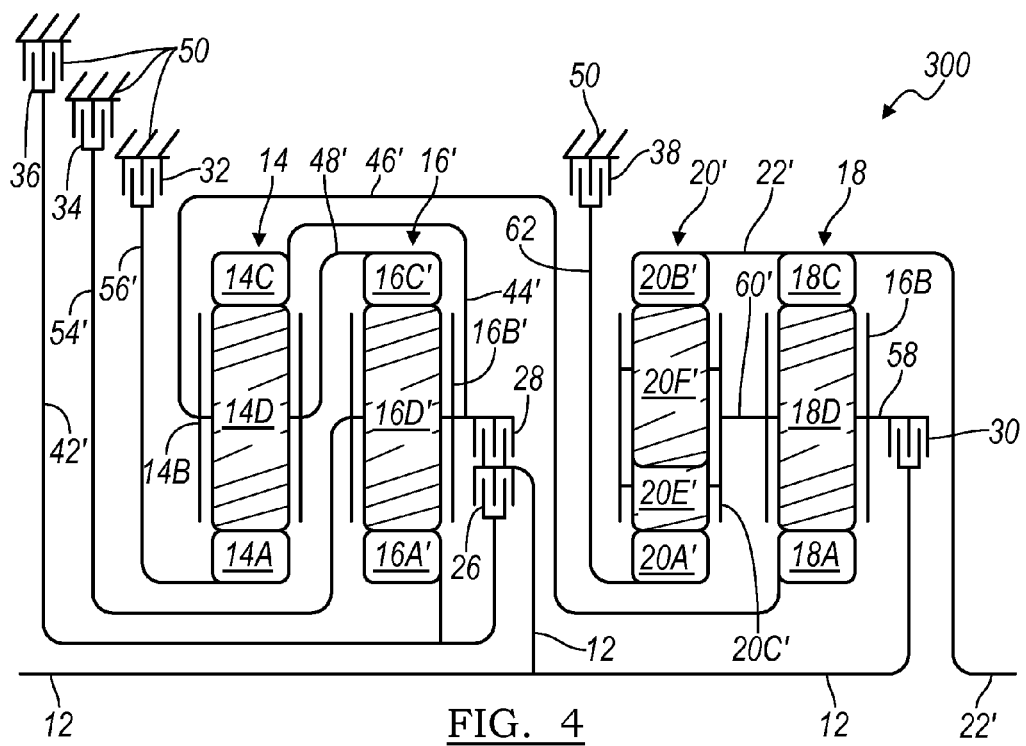
FIG. 4 is a diagrammatic representation of yet another embodiment of an eleven speed transmission according to the present invention.

With reference to FIG. 4, yet another embodiment of an eleven speed transmission 300 of the present invention is illustrated schematically. Transmission 300 has the some of the same components as transmission 100 including planetary gear sets, clutches and brakes, interconnecting members of the planetary gear sets as indicated by like reference numbers depicting like components. However, transmission 300 replaces the planetary gear set 16 which is a compound planetary gear set with a simple planetary gear set 16'. As described above, compound planetary gear set 16 is referred to as a compound planetary gear set because planetary gear set 16 has a carrier member 16B that supports two sets of planet or pinion gears 16D and 16E. In contrast, the simple planetary gear set 16' has a carrier member 16B' that rotatable supports only one set of planet gears or pinion gears 16D'. Further, simple planetary gear set 16' has a sun gear 16A' and a ring gear 16C'. Moreover, interconnecting member 42 has been reconfigured as interconnecting member 42' and now connects the sun gear 16A' to transmission housing 50. Interconnecting member 54 has been reconfigured as interconnecting member 54' and now connects the carrier member 16B' and ring gear 14C to transmission housing 50. Interconnecting member 56 has been reconfigured as interconnecting member 56' and now connects the sun gear 14A to transmission housing 50. Interconnecting member 44 has been reconfigured as interconnecting member 44' and now connects the carrier member 16B' to ring gear 14C. Interconnecting member 46 has been reconfigured as interconnecting member 46' and now connects the carrier member 14B to sun gear 18A. Interconnecting member 48 has been reconfigured as interconnecting member 48' and now connects the carrier member 14B to ring gear 16C'. In transmission 300 planetary gear set 16' is disposed between planetary gear set 14 and planetary gear set 20' instead of planetary gear set 14 being disposed between planetary gear set 16 and planetary gear set 20' as is the case for transmission 100. Accordingly, the other interconnecting members of transmission 300 remain the same in number or quantity as transmission 100, however, the length and configuration or shape of the interconnecting members are modified as shown in FIG. 4 to make the required connections between the members of the planetary gear sets and the clutches and brakes.

Figures 5, 6:
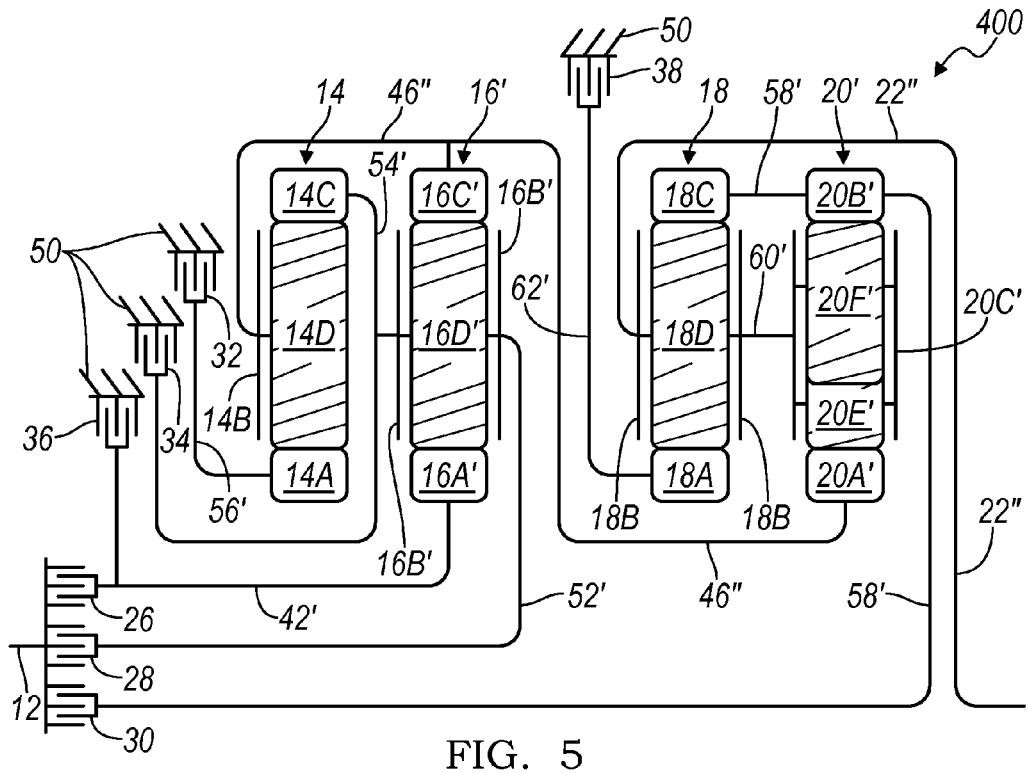
FIG. 5 is a diagrammatic representation of still another embodiment of an eleven speed transmission according to the present invention.
FIG. 6 is a truth table presenting the state of engagement of the various torque transmitting elements in each of the available forward and reverse speeds or gear ratios of the transmissions illustrated in FIGS. 1, 2, 4 and 5.

With reference to FIG. 5, still another embodiment of an eleven speed transmission 400 of the present invention is illustrated schematically. Transmission 400 has the some of the same components as transmission 300 including planetary gear sets, clutches and brakes, interconnecting members of the planetary gear sets as indicated by like reference numbers depicting like components. However, in transmission 400 planetary gear set 18 is disposed between planetary gear set 16' and planetary gear set 20' instead of planetary gear set 20' being disposed between planetary gear set 16' and planetary gear set 18 as is the case for transmission 300. Moreover, interconnecting member 46' has been reconfigured as interconnecting member 46" and now connects the carrier member 14B to ring gear 16C' and to sun gear 20A'. Interconnecting member 62 has been reconfigured as interconnecting member 62' and now connects the sun gear 18A to transmission housing 50. Output shaft or member 22' has been reconfigured as output shaft or member 22" and now is connected to the carrier member 18B and to carrier member 20C through interconnecting member 60'. Accordingly, the other interconnecting members of transmission 400 remain the same in number or quantity as transmission 300, however, the length and configuration or shape of the interconnecting members are modified as shown in FIG. 5 to make the required connections between the members of the planetary gear sets and the clutches and brakes.

Referring now to FIGS. 1, 2, 3 and 6, the operation of the embodiment of the eleven speed transmissions 10, 100 and 200 will be described. It will be appreciated that the transmissions 10, 100 and 200 are capable of transmitting torque from the input shaft or member to the output shaft or member in at least eleven forward speed or torque ratios and at least one reverse speed or torque ratio with an overdrive. Each forward and reverse speed or torque ratio is attained by engagement of one or more of the torque-transmitting mechanisms (i.e. first clutch 26, second clutch 28, third clutch 30, first brake 32, second brake 34, third brake 36 and fourth brake 38), as will be explained below. FIG. 6 is a truth table presenting the various combinations of torque-transmitting elements that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmissions 10, 100 and 200. An example of the gear ratios that may be obtained using the embodiments of the present invention are also shown in FIG. 6. Of course, other gear ratios are achievable depending on the gear diameter, gear teeth count and gear configuration selected.

With respect to transmissions 10 and 100, a reverse gear ratio is established by engaging or activating, the first clutch 26, the second brake 34 and fourth brake 38. The first clutch 26 connects the first shaft or interconnecting member 42 with the input shaft or member 12. The second brake 34 connects the seventh shaft or interconnecting member 56 with a stationary element or the transmission housing 50 in order to prevent the seventh shaft or interconnecting member 56 from rotating relative to the transmission housing 50. The fourth brake 38 connects the tenth shaft or interconnecting member 62 with the stationary element or the transmission housing 50 in order to prevent the eleventh shaft or interconnecting member 62 from rotating relative to the transmission housing 50. Likewise, the eleven forward ratios are achieved through different combinations of clutch and brake engagement, as shown in FIG. 6.

With respect to transmission 200, a reverse gear is established by engaging or activating, the first clutch 26, the second brake 34 and fourth brake 38. The first clutch 26 connects the first shaft or interconnecting member 42 with the input shaft or member 12. The second brake 34 connects the seventh shaft or interconnecting member 56 with a stationary element or the transmission housing 50 in order to prevent the seventh shaft or interconnecting member 56 from rotating relative to the transmission housing 50. The fourth brake 38 connects the tenth shaft or interconnecting member 262 with the stationary element or the transmission housing 50 in order to prevent the tenth shaft or interconnecting member 62 from rotating relative to the transmission housing 50. Likewise, the eleven forward ratios are achieved through different combinations of clutch and brake engagement, as shown in FIG. 6.

With respect to transmission 300, a reverse gear is established by engaging or activating, the first clutch 26, the second brake 34 and fourth brake 38. The first clutch 26 connects the reconfigured first shaft or interconnecting member 42' with the input shaft or member 12. The second brake 34 connects the reconfigured seventh shaft or interconnecting member 54' with a stationary element or the transmission housing 50 in order to prevent the reconfigured seventh shaft or interconnecting member 54' from rotating relative to the transmission housing 50. The fourth brake 38 connects the tenth shaft or interconnecting member 62 with the stationary element or the transmission housing 50 in order to prevent the tenth shaft or interconnecting member 62 from rotating relative to the transmission housing 50. Likewise, the eleven forward ratios are achieved through different combinations of clutch and brake engagement, as shown in FIG. 6.

With respect to transmission 400, a reverse gear is established by engaging or activating, the first clutch 26, the second brake 34 and fourth brake 38. The first clutch 26 connects the reconfigured first shaft or interconnecting member 42' with the input shaft or member 12. The second brake 34 connects the reconfigured seventh shaft or interconnecting member 54' with a stationary element or the transmission housing 50 in order to prevent the reconfigured seventh shaft or interconnecting member 54' from rotating relative to the transmission housing 50. The fourth brake 38 connects the reconfigured tenth shaft or interconnecting member 62' with the stationary element or the transmission housing 50 in order to prevent the reconfigured tenth shaft or interconnecting member 62' from rotating relative to the transmission housing 50. Likewise, the eleven forward ratios are achieved through different combinations of clutch and brake engagement, as shown in FIG. 6.

Further, with respect to the operation of transmissions 300 and 400 and the establishment of the remaining gear ratios, the first and third brakes 32 and 36 are switched as shown in FIG. 6. More specifically, first brake 32 is activated to establish the first, second, eighth, ninth and tenth gear ratios as opposed to the third brake 36 as is the case for transmissions 10, 100 and 200. Further, third brake 36 is activated to establish the fourth and sixth gear ratios as opposed to the first brake 32 as is the case for transmissions 10, 100 and 200. The activation of the other clutches and brakes to establish the remaining gear ratios remain the same, as shown in FIG. 6 for the various embodiments described above.

It will be appreciated that the foregoing explanation of operation and gear states of the eleven speed transmissions 10, 100, 200, 300 and 400 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the spirit of the invention are intended to be within the scope of the invention. Such variations are not to be regarded as a departure from the spirit and scope of the invention.

What is claimed is:

1. A transmission comprising:
an input member;
an output member;
first, second, third and fourth planetary gear sets each having first, second and third members;
five interconnecting members each continuously interconnecting one of the members of the first, second, third and fourth planetary gear sets with another member the first, second, third and fourth planetary gear sets; and
seven torque transmitting devices each selectively engageable to interconnect at least one of the first, second, and third members with at least one other of the first members, second members, third members and a stationary member, and
wherein the torque transmitting devices are selectively engageable in combinations of at least three to establish a plurality of forward speed ratios and at least one reverse speed ratio between the input member and the output member and at least one of the first, second, third, and fourth planetary gear sets includes a first and a second set of pinion gears.

2. The transmission of claim 1 wherein a first of the five interconnecting members continuously interconnects the third member of the first planetary gear set with the third member of the second planetary gear.

3. The transmission of claim 2 wherein a second of the three interconnecting members continuously interconnects the third member of the second planetary gear set with the first member of the third planetary gear set.

4. The transmission of claim 3 wherein a third of the five interconnecting members continuously interconnects the second member of the first planetary gear set with the second member of the second planetary gear set.

5. The transmission of claim 4 wherein a fourth of the five interconnecting members continuously interconnects the second member of the third planetary gear set with the third member of the fourth planetary gear set.

6. The transmission of claim 5 wherein a fifth of the five interconnecting members continuously interconnects the third member of the third planetary gear set with the second member of the fourth planetary gear set.

7. The transmission of claim 1 wherein a first of the seven torque transmitting devices is selectively engageable to interconnect the first member of the first planetary gear set with the input member.

8. The transmission of claim 7 wherein a second of the seven torque transmitting devices is selectively engageable to interconnect the second member of the first planetary gear set and the second member of the second planetary gear set with the input member.

9. The transmission of claim 8 wherein a third of the seven torque transmitting devices is selectively engageable to interconnect the second member of the third planetary gear set and the third member of the fourth planetary gear set with the input member.

10. The transmission of claim 9 wherein a fourth of the seven torque transmitting devices is selectively engageable to interconnect the first member of the first planetary gear set with the stationary member.

11. The transmission of claim 10 wherein a fifth of the seven torque transmitting devices is selectively engageable to interconnect the second member of the second planetary gear set with the stationary member.

12. The transmission of claim 11 wherein a sixth of the seven torque transmitting devices is selectively engageable to interconnect the first member of the second planetary gear set with the stationary member.

13. The transmission of claim 12 wherein a seventh of the seven torque transmitting devices is selectively engageable to interconnect the first member of the fourth planetary gear set with the stationary member.

14. The transmission of claim 1 wherein the first and fourth planetary gear sets are disposed between the second and third planetary gear sets.

15. The transmission of claim 1 wherein the first members of each of the first and second planetary gear sets are sun gears, the second member of each of the first and second planetary gear sets are carrier members, and the third member of each of the first and second planetary gear sets are ring gears.

16. The transmission of claim 15 wherein the first members of each of the third and fourth planetary gear sets are sun gears, the second member of each of the third and fourth planetary gear sets are carrier members, and the third member of each of the third and fourth planetary gear sets are ring gears, and wherein the carrier member of the second planetary gear set rotatably supports a first and a second set of planet pinions, the first set of planet pinions mesh with the sun gear and the second set of planet pinions, and the second set of planet pinions mesh with the ring gear and the first set of planet pinions.

17. The transmission of claim 13 wherein output member is continuously interconnected with the third member of the third planetary gear set.

18. A transmission comprising:
an input member;
an output member;
first, second, third and fourth planetary gear sets each having first, second and third members;
five interconnecting members each continuously interconnecting one of the members of the first, second, third and fourth planetary gear sets with another member the first, second, third and fourth planetary gear sets;
a first torque transmitting device selectively engageable to interconnect the first member of the first planetary gear set with the input member;
a second torque transmitting device selectively engageable to interconnect the second member of the first planetary gear set with the input member;
a third torque transmitting device selectively engageable to interconnect the third member of the third planetary gear set with the input member;
a fourth torque transmitting device selectively engageable to interconnect the first member of the first planetary gear set with a stationary member;
a fifth torque transmitting device selectively engageable to interconnect the second member of the second planetary gear set with the stationary member;
a sixth torque transmitting device selectively engageable to interconnect the first member of the second planetary gear set with the stationary member; and
a seventh torque transmitting device selectively engageable to interconnect the first member of the third planetary gear set with the stationary member, and
wherein the torque transmitting devices are each selectively engageable in combinations of at least three to establish a plurality of forward speed ratios and at least one reverse speed ratio between the input member and the output member and at least one of the first, second, third, and fourth planetary gear sets includes a first and a second set of pinion gears.

19. The transmission of claim 18 wherein a first of the five interconnecting members continuously interconnects the third member of the first planetary gear set with the third member of the second planetary gear.

20. The transmission of claim 19 wherein a second of the three interconnecting members continuously interconnects the third member of the second planetary gear set with the first member of the third planetary gear set.

21. The transmission of claim 20 wherein a third of the five interconnecting members continuously interconnects the second member of the first planetary gear set with the second member of the second planetary gear set.

22. The transmission of claim 21 wherein a fourth of the five interconnecting members continuously interconnects the second member of the third planetary gear set with the third member of the fourth planetary gear set.

23. The transmission of claim 22 wherein a fifth of the five interconnecting members continuously interconnects the third member of the third planetary gear set with the second member of the fourth planetary gear set.

24. The transmission of claim 18 wherein the first members of each of the first and second planetary gear sets are sun gears, the second member of each of the first and second planetary gear sets are carrier members, and the third member of each of the first and second planetary gear sets are ring gears.

25. The transmission of claim 18 wherein the first members of each of the third and fourth planetary gear sets are sun gears, the second member of each of the third and fourth planetary gear sets are carrier members, and the third member of each of the third and fourth planetary gear sets are ring gears, and wherein the carrier member of the second planetary gear set rotatably supports a first and a second set of planet pinions, the first set of planet pinions mesh with the sun gear and the second set of planet pinions, and the second set of planet pinions mesh with the ring gear and the first set of planet pinions.

26. The transmission of claim 18 wherein output member is continuously interconnected with the third member of the third planetary gear set.

27. A transmission comprising:
an input member;
an output member;
first, second, third and fourth planetary gear sets each having a sun gear, a carrier member and a ring gear,
four interconnecting members each continuously interconnecting one of the sun gear, carrier member, and ring gear of the one of the first, second, third and fourth planetary gear sets with another one of the sun gear, carrier member, and ring gear of the first, second, third and fourth planetary gear sets;
seven torque transmitting devices each selectively engageable to interconnect one of the sun gear, carrier member, and ring gear of the one of the first, second, third and fourth planetary gear sets with another one of the sun gear, carrier member, and ring gear of the one of the first, second, third and fourth planetary gear sets, a stationary member, and the input member, and wherein the torque transmitting devices are each selectively engageable in combinations of at least three to establish at least eleven forward speed ratios and at least one reverse speed ratio between the input member and the output member and at least one of the first, second, third, and fourth planetary gear sets includes a first and a second set of pinion gears.

28. The transmission of claim 27 wherein a first of the four interconnecting members continuously interconnects the ring gear of the first planetary gear set with the carrier member of the second planetary gear set.

29. The transmission of claim 28 wherein a second of the four interconnecting members continuously interconnects the carrier member of the first planetary gear set with the ring gear of the second planetary gear set and the sun gear of the third planetary gear set.

30. The transmission of claim 29 wherein a third of the four interconnecting members continuously interconnects the carrier member of the third planetary gear set with the carrier member of the fourth planetary gear set.

31. The transmission of claim 30 wherein a fourth of the four interconnecting members continuously interconnects the ring gear of the third planetary gear set with the ring gear of the fourth planetary gear set.

32. The transmission of claim 27 wherein a first of the seven torque transmitting devices is selectively engageable to interconnect the sun gear of the second planetary gear set with the input member.

33. The transmission of claim 32 wherein a second of the seven torque transmitting devices is selectively engageable to interconnect the carrier member of the second planetary gear with the input member.

34. The transmission of claim 33 wherein a third of the seven torque transmitting devices is selectively engageable to interconnect the sun gear of the first planetary gear set with a stationary member.

35. The transmission of claim 34 wherein a fourth of the seven torque transmitting devices is selectively engageable to interconnect the carrier member of the second planetary gear set with the stationary member.

36. The transmission of claim 35 wherein a fifth of the seven torque transmitting devices is selectively engageable to interconnect the sun gear of the second planetary gear set with the stationary member.

37. The transmission of claim 36 wherein a sixth of the seven torque transmitting devices is selectively engageable to interconnect the carrier member of the third planetary gear set with the input member.

38. The transmission of claim 37 wherein a seventh of the seven torque transmitting devices is selectively engageable to interconnect the sun gear of the fourth planetary gear set with the stationary member.

* * * * *